Patented Dec. 3, 1929

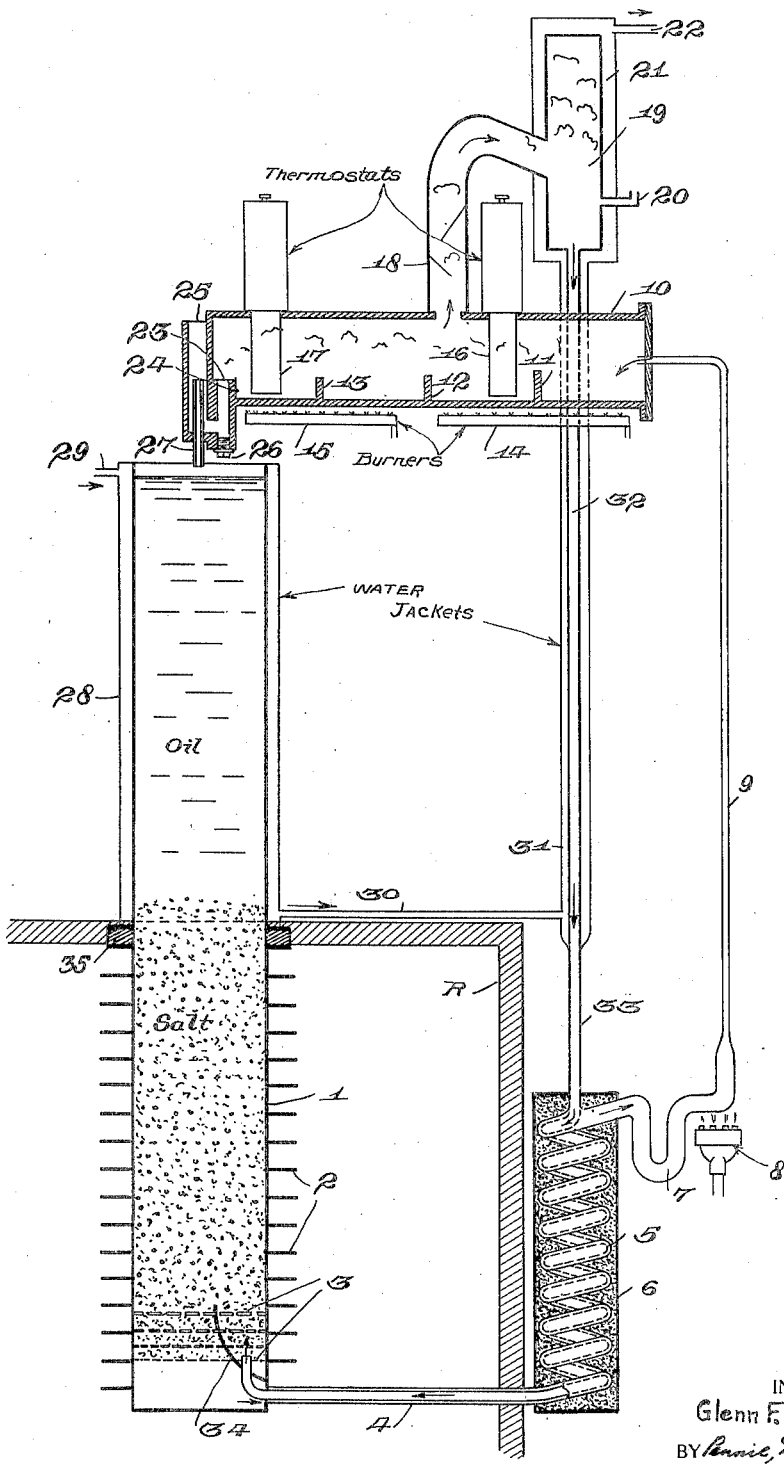

1,738,342

UNITED STATES PATENT OFFICE

GLENN FABER ZELLHOEFER, OF URBANA, ILLINOIS

REFRIGERATING SYSTEM

Application filed September 3, 1926. Serial No. 133,395.

The invention relates to a refrigerating system and to a method of refrigerating. More particularly it relates to a refrigerating system of the kind embodied in my co-pending application Serial No. 68,083, filed November 10, 1925, wherein a cooling effect is produced by means of a salt having a negative heat of solution. When such a salt is dissolved in a solvent such as water, it exerts a chilling effect and the chilling effect is herein utilized to produce refrigeration.

An object of the present invention is to provide a method of and apparatus for refrigerating which avoids the use of ice or an expansible gas.

It is a further object of the invention to provide such a method and apparatus as will permit the use of a normally solid composition such as salt.

A further object of the invention is to provide a method of refrigerating and an apparatus wherein a salt may be alternately dissolved and substantially dried, whereby a continuous chilling effect is produced, and in which the materials are intermingled and dissolved in a cold state.

A still further object of the invention is to provide an apparatus in which the main salt receptacle is relatively large, whereby to permit the use of a considerable quantity of salt and thereby obtain a maximum refrigerating effect.

An embodiment of the invention is shown in the accompanying drawing which is a vertical section of an illustrative form of the apparatus.

Referring to the drawing, the letter R represents a portion of a refrigerating compartment in which the refrigerating receptacle is placed. The refrigerating receptacle is designated by the numeral 1 and consists of a container, preferably provided with flanges 2, and extending some distance above the top of the refrigerator. The receptacle 1 is provided near its lower end with one or more perforated plates or partitions 3, the lowermost of which is spaced somewhat above the lowermost end of the container. An outflow pipe 4 leads from the lower extremity of the container to a point outside of the refrigerator, where it continues in the form of a coil 5 surrounded by an insulating jacket 6. The pipe 4 is continued beyond the insulating jacket 6 to check valve at 7, and passes in proximity to a burner 8, or like source of heat. The burner is preferably a non-luminous gas flame, but the particular kind of heat is immaterial as any convenient source of heat may be employed. The burner or like heating element may be controlled by thermostatic means as is well known. The pipe then is continued upwardly, but preferably of smaller diameter or cross section as indicated at 9. This pipe leads to a distilling chamber 10.

The distilling chamber 10 is provided with a series of baffles 11, 12 and 13, which may be graduated in height so that the lowermost baffle is most remote from the inlet end of the distilling chamber. One or more burners, such as 14 and 15, or other heating elements, are provided beneath the distilling chamber in order to supply heat to the same, and each burner or heater so employed is controlled by a corresponding thermostat 16 and 17 extending into the chamber. A steam vent 18 leads from the distilling chamber to a condenser 19, preferably provided with a vent 20. The condenser 19 is surrounded by a water jacket 21, provided with an outflow vent 22, the same being the terminus of the condensing system of the apparatus as a whole.

The outlet end of the distilling chamber is provided with an outlet port 23, forming a baffle 24, the outlet port forming a U-shaped member around the end wall of the distilling chamber and being vented as at 25. The lowermost part of the U-member may be provided with a plug 26, it being convenient to cast the member with an aperture as shown. The plug may be permanently fixed or it may be removable, as desired.

A pipe 27 leads from the outer section of the U-shaped member to the upper part of the receptacle 1, thereby establishing a complete circuit of the system so far as described.

The part of the receptacle 1 extending above the refrigerator is contained within a water jacket 28 having an inlet port 29. A pipe 30 connected to the lower part of the water jacket and at a convenient distance above the refrigerator, leads to a condenser 31 located above the insulating jacket 6. This condenser 31 extends upwardly to the water jacket 21 which forms a continuation thereof. It will, therefore, be seen that the condensing system comprises the inlet 29, the water jacket 28, the pipe 30, the condenser 31, the water jacket 21 and the outlet 22, and this system may be supplied by circulating ordinary tap water or water from any convenient source.

The condenser 19 is provided at its lower extremity with an outflow pipe 32 located, for a substantial part of its length, within the condenser 31, and continuing beyond the condenser as at 33 to the insulating jacket 6. Within the insulating jacket the pipe 33 enters interiorly of the coil 5, and continues interiorly of the coil 5 and the pipe 4 to a point in the lower part of the receptacle 1 and terminates some slight distance above the lowermost partition 3. A baffle 34 may be provided about the outlet end of this pipe in order to deflect the condensed water.

In the container 1 and within that portion of the container lying between the partitions 3 and the top of the refrigerator R, is placed a quantity of salt. The salt employed is one having a negative heat of solution and a melting point somewhat in excess of the boiling point of water. Potassium sulfocyanate having a negative heat of solution and melting at about 160° C. is an example of a salt such as may be employed to produce the desired refrigerating effect, although the invention is not limited to the use of this salt which is merely given by way of example. In the upper part of the receptacle 1 lying exteriorly of the refrigerator is placed a body of oil, such as ordinary mineral oil. In filling the system the quantities of the materials are so related that the oil, which floats on the solution, substantially fills the part of the receptacle 1 exterior to the refrigerator, and the salt is present in sufficient quantity to maintain the level of the salt in contact with the oil, while the amount of solution fills the remaining portion of the system sufficiently to just maintain an overflow from the pipe 9 into the distilling chamber 10 while the system is in operation.

The system, being arranged and supplied with materials as above described, operates as follows: The salt in the receptacle 1 dissolves in the water which is in the receptacle and produces a refrigerating effect due to its negative heat of solution. This refrigerating effect is transmitted to the refrigerator by the walls of the receptacle, supplemented by the increased cooling surfaces of the flanges 2. The solution, having exerted its cooling effect, is drawn off through the pipe 4 and the coil 5 by means of the convection currents established by means of the burner 8. The solution continues beyond the burner 8 through the pipe 9 and emerges into the distilling chamber 10, where it is heated by the burners 14 and 15. The steam volatilized from the solution in the distilling chamber 10, is conducted by means of the vent 18 to the condenser 19, where it is condensed and returned through the pipes 32 and 33 to the receptacle 1. This condensing process cools the water to a considerable degree, and it is further cooled by reason of the fact that it passes within the coil 5 which is quite cold due to the cold refrigerating solution passing therethrough. As the steam is volatilized within the distilling chamber 10, the solution becomes more and more concentrated until, beyond the baffle 13, the salt is substantially dry although it is still in a molten state. The thermostats are so adjusted as to maintain the temperature only a few degrees in excess of the melting point of the salt. The salt being in a molten state, overflows the baffle 24 and passes through the pipe 27 where it drips into the oil in the upper part of the receptacle 1. The oil being cooled by the water in the surrounding water jacket 28, is maintained at a low temperature and causes the solidification of the molten salt and also cools the same. Conduction of heat to the lower part of the receptacle 1 is prevented by the use of suitable heat-insulating material 35. The salt passes downwardly through the oil and comes to rest in the oil on the upper surfaces of the salt crystals in receptacle 1. The salt so recovered is gradually lowered by the dissolution of the salt within the receptacle 1 which is effected and, in turn, is again dissolved by the water returned from the condenser, thereby again effecting a cooling operation. It will be seen that the process is continuous.

What I claim is:

1. In a refrigerating system of the class described, in combination, a container adapted to contain a refrigerating medium comprising a solute and a solvent therefor, means adapted to convey off the resulting solution, means adapted to effect the substantially complete separation of the solute and the solvent by application of sufficient heat to vaporize the solvent and melt the solute, means to separately restore the solute and solvent to their normal physical states by solidifying the molten solute and condensing the vaporized solvent, each such restoring means being vented to the atmosphere whereby to subject the restored substances to atmospheric pressure.

2. A refrigerating system comprising, in combination, a container lying partly within and partly without a space to be refrigerated, the parts being provided respectively with flanges and with a cooling jacket, partitions in the lower part of said container, an outlet pipe below the partitions, a distilling chamber, a conduit connecting the outlet pipe to the distilling chamber and provided with a source of heat, a heating element for the distilling chamber, a condenser associated with the distilling chamber, a conduit leading from the condenser to the lower part of the container, said last mentioned conduit lying for a portion of its length within the outlet pipe, a port leading from the distilling chamber, a pipe connecting said port to the upper portion of the container, the said port and the said condenser being separately vented to permit exposure to the atmosphere.

3. A refrigerating system including a solute and a solvent and comprising a container having a portion supported within a space to be refrigerated and a portion insulated therefrom extending as a continuation thereof without said space, said interior portion having a perforated portion for supporting the solute thereon, said exterior portion containing a liquid, within which the solute in molten form will solidify supported upon the solute, means for delivering the solvent to act upon the solute in the container, a distilling chamber, means for withdrawing the resultant solution from the container and delivering it to the distilling chamber, said distilling chamber having division plates therein, means for applying heat in varying degrees to the divisions so formed, whereby as the solvent passes off the solute in the form of vapor, the remaining solute may be brought to a molten state, a condenser, means to conduct the vaporized solvent from the distilling chamber to the condenser, and the condensed solvent therefrom to the delivery means of the container, and means delivering the molten solute from the distilling chamber and discharging it into the solidifying liquid in the container, said container so supported that gravity will cause the molten solute as it solidifies to pass through the solidifying liquid to rest upon the upper surface of the solute in the lower part of the container.

4. A refrigerating apparatus of the character described, comprising a refrigerating device in which the cold solution is received for the absorption of heat, a concentrator, a crystallizer and dissolver to receive an immiscible cooling medium and in which the salt is crystallized out of the solution by reduction in temperature and is received in the dissolver for further solution, means including a dropper to deliver the concentrated solution from the concentrator to the crystallizer in drops, and means to return the solution from the dissolver to the concentrator.

In testimony whereof I affix my signature.

GLENN FABER ZELLHOEFER.